(12) United States Patent
Fouarge

(10) Patent No.: US 7,906,597 B2
(45) Date of Patent: Mar. 15, 2011

(54) METHOD AND APPARATUS FOR PREPARING AND SUPPLYING CATALYST SLURRY TO A POLYMERIZATION REACTOR

(75) Inventor: Louis Fouarge, Dilbeek (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 1009 days.

(21) Appl. No.: 10/589,315

(22) PCT Filed: Feb. 14, 2005

(86) PCT No.: PCT/EP2005/050625
§ 371 (c)(1),
(2), (4) Date: Apr. 9, 2007

(87) PCT Pub. No.: WO2005/077522
PCT Pub. Date: Aug. 25, 2005

(65) Prior Publication Data
US 2008/0039596 A1     Feb. 14, 2008

(30) Foreign Application Priority Data

Feb. 13, 2004  (EP) .................................... 04100570
Feb. 13, 2004  (EP) .................................... 04100597

(51) Int. Cl.
*C08F 2/12* (2006.01)
*B01J 4/00* (2006.01)
*C08F 10/02* (2006.01)

(52) U.S. Cl. ............. 526/64; 526/88; 526/919; 422/131; 422/132; 137/561 R

(58) Field of Classification Search .................... 526/64, 526/919, 88; 422/132, 131; 137/561 R
See application file for complete search history.

(56) References Cited

U.S. PATENT DOCUMENTS

2003/0114608 A1 * 6/2003 Tharappel et al. .............. 526/64

* cited by examiner

*Primary Examiner* — Fred M Teskin
(74) *Attorney, Agent, or Firm* — Tenley R. Krueger

(57) ABSTRACT

The present invention relates to an apparatus for preparing and supplying catalyst to an ethylene slurry loop polymerisation reactor and to an apparatus for controlling the injection of catalyst slurry in a polymerization reactor wherein polyethylene is prepared. The present invention a lso relates to a method for optimising catalyst supply to a polymerisation reactor. The diluted catalyst is transferred to the reactor (1) using a membrane pump (5) controllable in function of the concentration of a reactant in said reactor (1).

22 Claims, 5 Drawing Sheets

METHOD AND APPARATUS FOR PREPARING AND SUPPLYING CATALYST SLURRY TO A POLYMERIZATION REACTOR

FIELD OF THE INVENTION

This invention relates to catalytic reactions. In a first aspect, the invention relates to an apparatus for preparing and supplying catalyst slurry to a polymerisation reactor. The invention also relates to an apparatus for controlling catalyst feeding to a polymerisation reactor. In another aspect, the invention relates to a method for optimising the supply of catalyst to a polymerisation reactor. In yet another aspect the invention relates to a method for controlling catalyst feeding to a polymerisation reactor.

BACKGROUND

Polyethylene (PE) is synthesized via polymerizing ethylene ($CH_2=CH_2$) monomer and optionally a higher 1-olefin comonomer such as 1-butene, 1-hexene, 1-octene or 1-decene. Because PE is cheap, safe, stable to most environments and easy to be processed polyethylene polymers are useful in many applications. According to the synthesis methods, PE can be generally classified in to several types such as LDPE (Low Density Polyethylene), LLDPE (Linear Low Density Polyethylene), and HDPE (High Density Polyethylene). Each type of polyethylene has different properties and characteristics.

It is known that the polymerisation of olefins e.g. ethylene, especially by a gas phase polymerisation process, involves the polymerisation of olefin monomer with the aid of catalyst and optionally, if required depending on the used catalyst, a co-catalyst. Suitable catalysts for use in the production of polyolefins, and in particular for the preparation of polyethylene, comprise chromium-type catalysts, Ziegler-Natta catalysts and metallocene catalysts.

It is well known that the polymerisation reaction is quite sensitive to the quantity of catalyst utilized. It is important to control catalyst flow to a reactor since unexpected or uncontrolled catalyst injection in a reactor could lead to runaway reactions. However, one of the major problems in the injection of catalyst slurry to a reactor in prior art methods is that it is difficult to control the amount of catalyst and the flow rate of the catalyst injected.

According to prior art catalyst supply systems, catalyst may be provided to a polymerization reaction either in concentrated form, e.g. directly from a mud pot, or in diluted form.

Direct feeding of catalyst slurry from a storage vessel to a reactor has the disadvantage that the feeding rate of the catalyst to the reactor cannot be adequately controlled. A lso, in cases involving direct supply of a (concentrated) catalyst to a reactor, the catalysts can completely be flushed in the reactor, when a problem occurs during the preparation of the catalysts. Such uncontrolled catalyst supply may induce runaway reactions in the reactor.

Moreover, in the case catalyst in oil suspension is provided directly to a reactor, the used pumps, generally progressive cavity pumps, are not able to dose the catalyst flow and the amount of catalyst injected in the reactor. Furthermore, such systems require the switch over of the catalyst injection system, every time a new batch of catalyst needs to be connected to the reactor for supply thereto. Therefore, such injection systems do not provide an optimal and reliable control of the catalyst flow rate.

Several systems have been disclosed which involve the preparation and the supply of diluted catalyst slurry to a polymerization reaction. In general, for preparing catalyst slurry, a mixture of dry solid particulate catalyst and diluent are apportioned in a catalyst storage vessel for thorough mixing. Then such catalyst slurry is typically transferred directly to a polymerization reaction vessel for contact with the monomer reactants, generally under high pressure conditions.

GB 838,395 relates to a process and apparatus for producing a slurry of a solid catalyst in hydrocarbon diluent for use in a chemical reaction. The process comprises preparing concentrated catalyst slurry in a hydrocarbon diluent and admixing said concentrated slurry with additional diluent and introducing said admixture to a reaction zone. According to the process, the specific inductive capacity of the slurry is continuously determined prior to the introduction of same to said reaction zone, the inductive capacity of the slurry being dependent upon the concentration of catalyst in the slurry.

U.S. Pat. No. 3,726,845 describes a system wherein catalyst slurry is prepared in a vessel after which it is pumped to the polymerization reactor by means of a conduit provided with a pump. The catalyst slurry formed in the vessel and diluent are alternately fed through said conduit to the polymerization reactor by flowing catalyst for a selected number of seconds and then diluent for a selected number of seconds through the conduit to the polymerization reactor.

WO 2004/0264455 describes a catalyst slurry feeding system wherein diluted catalyst slurry is formed in a mixing tank and transferred to a storage tank, wherein it is maintained in diluted form before being supplied to a polymerization reactor. Catalyst slurry is supplied from the mixing to the storage tank by means of a conduit provided with a valve. The mixing tank can be at a higher elevation than the storage tank, so that the catalyst slurry flows from the mixing tank to the storage tank at least partially due to gravity, thereby avoiding the necessity of a pump between the mixing tank and the storage tank. Alternatively, the catalyst slurry can be moved between the tanks without a pump or a difference in elevation by maintaining a pressure differential between the mixing tank and the storage tank.

U.S. Pat. No. 5,098,667 discloses a catalyst supply system involving the transfer of concentrated catalyst from a mud pot to a dilution vessel through a conduit which includes a valve system for regulating the transfer. Diluted catalyst slurry is continuously supplied to the polymerization reactor by means of a conduit. In the described method the flow rate of the diluted slurry is manipulated so as to provide a desired flow rate of solid particles contained in the diluted slurry. Continuous catalyst flow is maintained at a desired rate in response to a computed value of the mass flow rate of the solid catalyst particles contained in the dilute slurry. The computed mass flow rate of catalyst particles is based upon "on line" measurements of density and flow rate of the dilute catalyst slurry stream flowing to the reactor, and on predetermined densities of the solid catalyst particles and the liquid diluent constituting the slurry.

However, although the above-described methods for preparing diluted catalyst provide an improvement on the control of catalyst flow, they have the disadvantage that the catalyst flow rate can not be reliably adjusted in function of the reaction conditions in the polymerisation reactor.

Another problem associated with available systems for preparing diluted catalyst is that these systems are relatively voluminous and cumbersome, and sometimes involve several tanks for storing diluted catalyst slurry. In addition, the use of large vessels and large amounts of diluent for preparing the diluted catalyst slurry implies several considerable disadvantages. The use of large volumes of diluted catalyst implies the use of large volumes of diluent (i.e. isobutane). Isobutane however, is an explosive chemical and may pose security problems.

Furthermore, when switching of catalyst type in a polymerization process, large amounts of catalyst material may remain unused and may need to be disposed off, which is not only very expensive but also implicates severe environmental regulations. In addition, the costs for cleaning the voluminous catalyst preparation systems after removal of the catalyst are high.

Therefore, there remains a need in the art for providing an improved method for controlling catalyst feeding to a polymerization reactor. More in particular, there remains a great need in the art for a system that continuously and reliably delivers diluted catalyst slurry to a loop reactor.

Furthermore, metallocene and Ziegler-Natta catalysts are usually employed with a co-catalyst for olefin polymerization, which can significantly enhance the polymerization efficiencies to beyond a million units of polymer per unit of catalyst. A number of techniques for the introduction of the co-catalyst to a polymerization reactor has been proposed. For instance some techniques consist of introducing the co-catalyst directly into the polymerization reactor. However, such technique does not allow bringing the co-catalyst into contact with the catalyst before entering the reactor, although such pre-contact is particularly desirable in order to provide effective catalyst-co-catalyst mixtures. Another technique consists of contacting the catalyst and co-catalyst before their introduction into the polymerization medium. In this latter case, however, having regard to the fact that the catalyst systems employed usually have maximum activity at the commencement of polymerization, it may be difficult to avoid reaction runaways liable to involve the formation of hot spots and of agglomerates of molten polymer.

In view hereof, it can be concluded that there remains also a need in the art for providing an improved method for controlling catalyst feeding, in pre-contact with a co-catalyst, to a polymerization reactor.

It is therefore a general object of this invention to provide an improved method and apparatus for optimising catalyst introduction in a polymerisation reactor. It is a particular object of the present invention to optimise the supply of a catalyst, commercially provided in an oil suspension or in a hydrocarbon solution, to a polymerisation reactor wherein polyethylene is prepared. More in particular, the present invention also aims to provide an apparatus and method enabling to effectively control the flow rate of a catalyst to a polymerisation reactor wherein polyethylene is prepared.

It is a further object of the present invention to provide an apparatus and method for controlling catalyst feeding, being in pre-contact with a co-catalyst, to a polymerisation reactor, wherein polyethylene is prepared.

Furthermore, the present invention aims to provide a method and an apparatus for improved control of the polymerization reaction of ethylene in a reactor.

SUMMARY OF THE INVENTION

In accordance with the present invention, an apparatus and a method are provided for preparing and supplying catalyst slurry to a polymerisation reactor and for controlling the injection of catalyst slurry into a polymerization reactor wherein polyethylene is prepared. Said catalyst slurry consists of solid catalyst in a hydrocarbon diluent.

In a first aspect, the invention relates to an apparatus for preparing and supplying catalyst slurry to a polymerization reactor wherein polyethylene is prepared, comprising
one or more storage vessels for containing concentrated catalyst slurry consisting of solid catalyst particles suspended in a hydrocarbon diluent or in a mineral oil,
a mixing vessel for containing diluted catalyst slurry of a suitable concentration for use in a polymerization reaction, being connected with said storage vessels by one or more conduits for transferring said catalyst slurry from said storage vessels to said mixing vessel, and being provided with one or more conduits for transferring the diluted catalyst slurry from said mixing vessel to said reactor, and
one or more conduits, connecting said mixing vessel to a polymerization reactor for transferring said diluted catalyst slurry from said mixing vessel to said reactor, whereby each conduit is provided with a membrane pump for pumping said slurry to said reactor, which is controllable in function of the concentration of a reactant in said reactor.

The present invention provides an apparatus, which allows preparing catalyst slurry having a suitable concentration for use in a polymerisation reaction, starting from catalyst, which is generally commercially supplied in a mineral oil, heptane or hexane suspension. Sometimes it is supplied in dry form.

According to the present invention, the catalyst is not introduced directly from the storage vessels (also referred herein to a catalyst transport vessel) to the reactor. The apparatus further comprises a mixing vessel, which acts as a "buffer" between the storage vessels and the reactor. As used herein the terms "mixing vessel" and "buffer vessel" are used as synonyms. The mixing vessel is operated at a pressure lower than the reactor pressure, thus eliminating the risk of uncontrolled high catalyst injection under high pressure to the reactor. Furthermore, such mixing vessel enables to dampen the discontinuous catalyst feed fluctuations to the reactor. Another advantage of providing a mixing vessel is that catalyst slurry can be further diluted to a concentration suitable for use in the polymerization reactor and that a slurry having a desired, substantially constant, concentration can be prepared. Moreover, a suitable, relatively low, concentration of catalyst, preferably comprised between 0.1 and 10% by weight, more preferably between 0.1 and 4%, even more preferred between 0.1 and 1% and most preferred 0.5% by weight, will enable to use membrane pumps for injecting the catalyst slurry in the reactor. Using of diluted catalyst slurry has the advantage that it is easier to control the amount and the flow of injected catalyst.

The use of membrane pumps in the present apparatus permits to transfer catalyst slurry to said reactor at controllable catalyst flow rate. In addition, the membrane pumps are particularly suitable for adjusting catalyst flow rate to a suitable value which is in accordance with the polymerization reaction taking place in the reactor, since these pumps are controllable in function of the concentration of a reactant in said reactor.

In another embodiment, the invention relates to an apparatus wherein one of more conduits for transferring catalyst slurry from said storage vessel to said mixing vessel comprises diluent injection means. These injection means are particularly suitable for enabling the dilution of catalyst slurry in line before being injected in the reactor, and in particular for diluting the catalyst slurry while transferring the slurry from the storage vessel to the mixing vessel.

In yet another preferred embodiment, the invention relates to an apparatus which further comprises flow measuring means for measuring the catalyst flow rate provided on said conduit for transferring the diluted catalyst slurry from said mixing vessel to said reactor.

Another problem relating to the field of catalyst supply to a reactor consists of supplying a co-catalyst during a polymerisation reaction. A number of techniques for the introduction of the co-catalyst have already been proposed, for example by introducing the co-catalyst directly into the polymerisation reactor. However, such methods do not allow bringing co-catalyst into contact with the catalyst before entering the reactor, although such pre-contact may be particularly desirable in order to provide effective catalyst-cocatalyst mixtures. Another technique consists of contacting the catalyst and co-catalyst before their introduction into the polymerisation medium. In this latter case, however, it is difficult to control the pre-contact time of the catalyst with the co-catalyst.

In a further embodiment, the present apparatus is therefore further provided with a co-catalyst distribution system (herein also referred to as to a co-catalyst feeding system), for bringing a suitable amount of co-catalyst into contact with the catalyst slurry for a suitable period of time before supplying said catalyst slurry to said reactor. In a preferred embodiment said system comprises a co-catalyst storage vessel and a conduit connected thereto for transferring said co-catalyst. In another preferred embodiment, said conduit is provided with a contact vessel for enhancing the contact time of said co-catalyst with said catalyst slurry in said conduit.

In another aspect, the invention relates to a method for optimising the supply of a catalyst slurry to a polymerisation reactor wherein polyethylene is prepared, comprising the steps of:
  providing concentrated catalyst slurry consisting of solid catalyst particles suspended in a hydrocarbon diluent or in a mineral oil in one or more storage vessels,
  diluting said concentrated catalyst slurry for obtaining a suitable concentration for use in a polymerisation reaction, whereby said catalyst slurry is diluted while being transferred from said storage vessel to a mixing vessel, wherein said diluted catalyst slurry is maintained,
  optionally further diluting said catalyst slurry in said storage vessel, and
  pumping said diluted catalyst slurry at a controlled flow rate from said mixing vessel to said polymerisation reactor through one or more conduits, by means of a pumping means, provided in each of said conduits.

The present methods provide improved injection of catalyst that is commercially supplied as solid particles at a suitable, controlled and limited flow rate in a polymerization reactor. Therefor, the methods broadly involve the transfer of concentrated catalyst slurry to a buffer vessel wherein catalyst is diluted and kept at a suitable concentration, before it is injected in the reactor. The method does not involve direct injection of catalyst from a storage vessel to a reactor. The present method is further in particular characterized in that the catalyst slurry is diluted in line before being injected in the reactor, and in particular is diluted while being transferred from said storage vessel to a mixing vessel, wherein said catalyst slurry may optionally be further diluted.

The present invention provides in particular a method that enables to supply catalyst slurry to a reactor at a perfectly controllable flow rate of catalyst supply. The present method comprises controlling the suitable flow rate of said catalyst slurry to said reactor by determining the concentration of a reactant in said reactor. Advantageously the present method enables to fine-tune catalyst supply to a reactor in function of the polymerisation reaction in the reactor. The polymerisation production rate in the reactor can be controlled by controlling the rate of catalyst feed to the reactor. According to this aspect the reactor is fed with an adequate and optimal concentration of catalyst slurry at a suitable feed rate, and as a consequence the productivity in the polymerisation reactor and consistency of the polymerisation product are considerably improved. Fluctuations in the properties and quality of the polymerisation product resulting from the polymerisation reaction are substantially avoided. Practically, fine-tuning of catalyst supply to a reactor in function of the polymerisation reaction is enabled by providing the conduit connecting the buffer vessel to the reactor with pumps, preferably membrane pumps, which are controllable and adjustable in function of a reactant concentration in the reactor.

More in particular, pumping means, preferably membrane pumps, are provided in each conduit for transferring the catalyst slurry from the mixing vessel to the polymerisation reactor. These pumps assure the transfer of catalyst slurry to said reactor at controllable flow rate. Moreover, the membrane pumps are capable of being regulated to adjust catalyst flow to said reactor in function of the polymerisation reaction in said reactor, since these pumps are controllable and adjustable in function of a reactant concentration in the reactor.

According to the invention the present apparatus and method enable to feed a reactor with an optimal concentration of catalyst slurry at a suitable catalyst flow rate, and as a consequence thereof enable to considerably improve the productivity in the polymerisation reaction in the reactor.

The present invention thus provides an apparatus and method for optimising the polymerisation reaction in a reactor by optimising the process of catalyst supply to said reactor and by providing an apparatus for doing so, which is simple in design, rugged in construction and economical to manufacture. The term "optimising the polymerisation reaction" refers to the improvement of the efficiency of the polymerization reaction and/or to the improvement of the quality of the obtained polymerization product.

The method and the apparatus according to the invention are particularly useful in the polymerisation process of ethylene, and preferably in a process for preparing bimodal polyethylene.

The various features which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE DRAWINGS

DETAILED DESCRIPTION OF THE INVENTION

Figure 1:
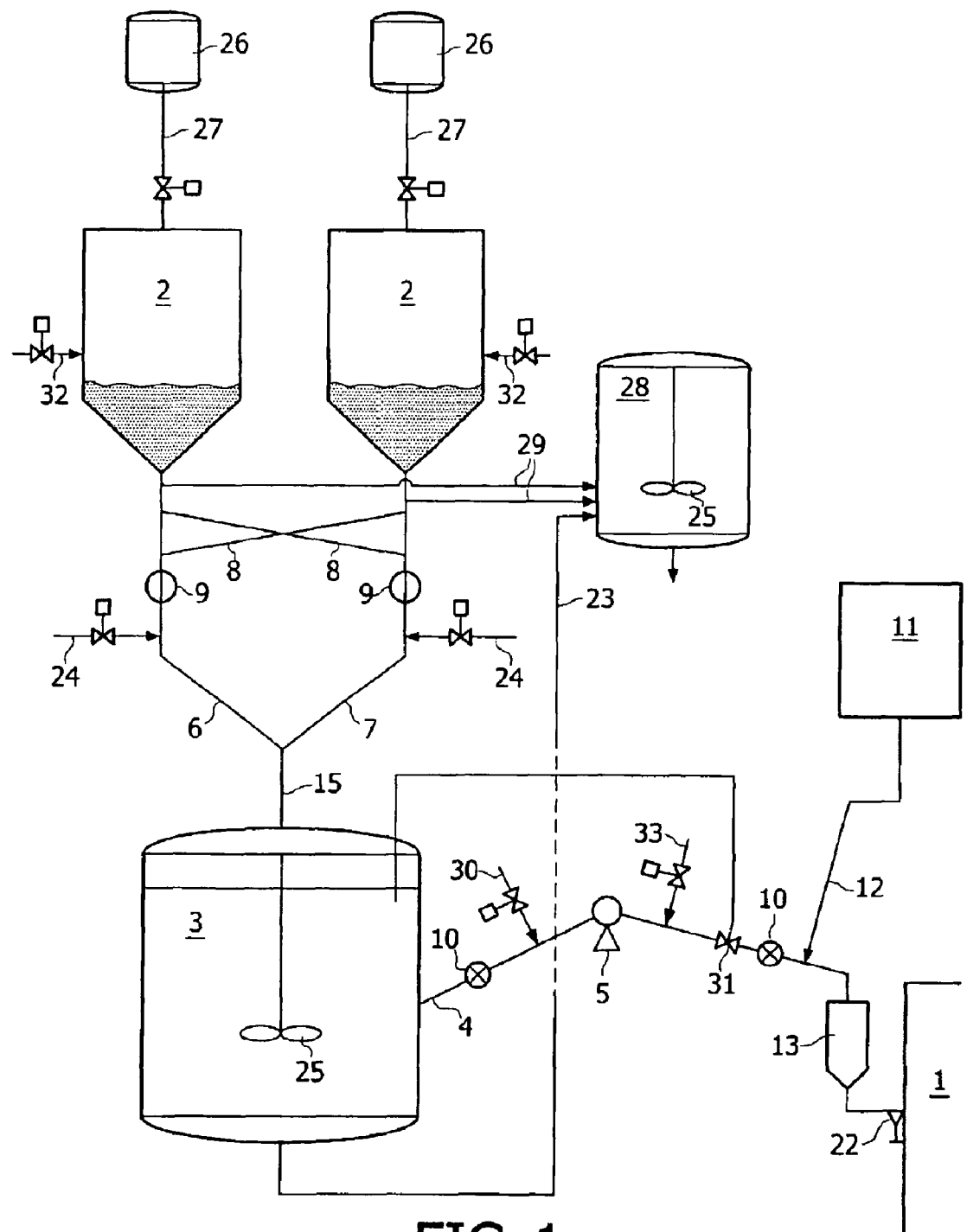
FIG. 1 is a schematic representation of a preferred embodiment of an apparatus according to the invention for controlling the injection of catalyst in a polymerisation reactor.

This invention is especially applicable to a process of supplying a catalyst to a polymerisation reactor. The invention is in particular described with reference to the supply of catalyst to a slurry loop polymerisation reactor wherein ethylene is polymerised. The polymerisation process of ethylene may for instance be carried out in loop reactors. Suitable "ethylene polymerisation" includes but is not limited to homo-polymerisation of ethylene, co-polymerisation of ethylene and a higher 1-olefin co-monomer such as butene, 1-pentene, 1-hexene, 1-octene or 1-decene. Ethylene polymerisation comprises feeding to a reactor the reactants including the monomer ethylene, a light hydrocarbon diluent, a catalyst and optionally, a co-monomer and hydrogen. In an embodiment of the present invention, said co-monomer is hexene and said diluent is isobutane.

In a particularly preferred embodiment, the invention relates to a process of supplying a catalyst to a polymerisation reactor wherein bimodal polyethylene is prepared. "Bimodal PE" refers to PE that is manufactured using two reactors, which are connected to each other in series. However, the present method for improving and optimising catalyst supply to a polymerisation reactor should be understood to be applicable to reactors wherein other types of polymerisation reactions take place as well.

According to the present invention the term "catalyst" is defined herein as a substance that causes a change in the rate of a polymerization reaction without itself being consumed in the reaction. Any catalyst allowing ethylene to be polymerised may be used. By way of examples of such catalysts, mention may be made of catalysts of the Ziegler-Natta type, catalysts based on vanadium or chromium, and metallocene catalysts. According to one preferred embodiment said catalyst is a metallocene or chromium catalyst. According to another embodiment, said catalyst may also be a Ziegler-Natta catalyst. In another particularly preferred embodiment, said catalyst may comprise any catalyst which is provided on a Si support.

Catalyst slurry can be prepared in different ways. One way consists of preparing catalyst slurry starting from solid catalyst particles, which are suspended in a suitable diluent, e.g. a hydrocarbon. Generally, such catalyst slurry can be transferred directly to a polymerisation reaction vessel for contact with the monomer reactants.

Catalyst slurry can also be obtained commercially in the form of solid catalyst particles, which are suspended in a mineral oil. Direct injection of such catalyst slurry in the reactor can be done by connecting the commercial vessel containing the catalyst in oil suspension with the reactor by means of conduits that are provided with suitable pumps. Such pumps typically are suitable for pumping liquids with significant amounts of solids, e.g. solid particles in crude oil. Examples of pumps of this type are commonly known as Moineau pumps or progressive cavity pumps, and are available commercially.

Several methods for supplying catalyst to a polymerisation reactor have been described in the prior art. For instance, U.S. Pat. No. 3,846,394 describes a process for the introduction of Ziegler-Natta catalyst slurry in a reactor. The process comprises the preparation of Ziegler-Natta catalyst slurry, the transfer of the slurry via a feed conduit from a storage zone to a metering zone, and the introduction of the slurry into a reactor. In order to avoid the back flow of monomer and other contents of the reactor into the Ziegler-Natta catalyst conduits the process provides the catalyst feed conduit to be flushed with an inert diluent to the Ziegler-Natta catalyst, said diluent being introduced into said conduit downstream of the metering zone.

Catalyst systems for polymerisation and co-polymerisation of olefins known as Ziegler-Natta systems consist on the one hand, as catalyst, of compounds of transition metals belonging to Groups IV to VII of the periodic table of elements, and on the other hand, as co-catalysts, of organometallic compounds of metals of Groups I to III of this Table. The catalysts most frequently used are the halogenated derivatives of titanium and vanadium, preferably associated with compounds of magnesium. Moreover, the co-catalysts most frequently used are organoaluminium or organozinc compounds. A characteristic of all Ziegler-Natta catalysts is that they all yield straight chain polymers.

The Ziegler-Natta catalyst is preferably of the general formula $MX_n$ wherein M is a transition metal compound selected from group IV to VII, wherein X is a halogen, and wherein n is the valence of the metal. Preferably, M is a group IV, group V or group VI metal, more preferably titanium, chromium or vanadium and most preferably titanium. Preferably, R is chlorine or bromine, and most preferably, chlorine. Illustrative examples of the transition metal compounds comprise but are not limited to $TiCl_3$, $TiCl_4$. In a particularly preferred embodiment of the invention said catalyst is a titanium tetrachloride ($TiCl_4$) catalyst.

Ziegler-Natta catalysts generally are provided on a support, i.e. deposited on a solid support. The support should be an inert solid, which is chemically unreactive with any of the components of the conventional Ziegler-Natta catalyst. The support is preferably a silica or magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

The term "metallocene catalyst" is used to describe any transition metal complexes consisting of metal atoms "sandwiched" between one or two ligands. In a preferred embodiment, the metallocene catalyst has a general formula MX, wherein M is a transition metal compound selected from group IV and wherein X is a ligand composed of one or two groups of cyclopentadienyl (Cp), indenyl, fluorenyl or their derivatives. Illustrative examples of metallocene catalysts comprise but are not limited to $Cp_2ZrCl_2$, $Cp_2TiCl_2$ or $Cp_2HfCl_2$.

The metallocene catalysts generally are provided on a solid support. The support should be an inert solid, which is chemically unreactive with any of the components of the conventional metallocene catalyst. The support is preferably a silica compound.

The use of metallocene catalysts in the production of polyolefins in general, and of polyethylene in particular, is known in the art. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerisation of olefins has various advantages. Metallocene catalysts have high activities and are capable of preparing polymers with enhanced physical properties in comparison with the polymers prepared using Ziegler-Natta catalysts. Metallocene catalysts are usually employed with a co-catalyst such as an organometallic compound, or a mixture of non-coordinated Lewis acid and alkylaluminium as it is well known in the art. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and growing chain of polymer.

Chromium-type catalysts refer to catalysts obtained by deposition of chromium oxide on a support, e.g. a silica or aluminum support. Illustrative examples of chromium catalysts comprise but are not limited to $CrSiO_2$ or $CrAl_2O_3$.

Generally co-catalysts are used to improve the activity of a Ziegler-Natta or a metallocene catalyst. The term "co-catalyst" as used herein is defined as a catalyst that can be used in conjunction with another catalyst in order to improve the activity and the availability of the other catalyst in a polymerisation reaction. In a preferred embodiment, said co-catalyst is a catalyst suitable for being used in conjunction with a Ziegler-Natta catalyst or a metallocene catalyst. The co-catalyst is used to promote the polymerisation activity of the Ziegler-Natta catalyst or the metallocene catalyst. Broadly, organometallic compounds of periodic groups I to III can be used as co-catalyst according to the present invention. Catalysts suitable for being used in conjunction with a metallocene catalyst may include organometallic compounds, or a mixture of non-coordinated Lewis acids and alkylaluminiums.

In a particularly preferred embodiment, said co-catalyst is a catalyst suitable for being used in conjunction with a Ziegler-Natta or a metallocene catalyst and is an organoaluminium compound, being optionally halogenated, having general formula $AlR_3$ or $AlR_2Y$, wherein R is an alkyl having 1-16 carbon atoms and R may be the same or different and wherein Y is hydrogen or a halogen. Examples of co-catalysts comprise but are not limited to trimethyl aluminum, triethyl aluminum, di-isobutyl aluminum hydride, is tri-isobutyl aluminium, tri-hexyl aluminum, diethyl aluminum chloride, or diethyl aluminum ethoxide. A particularly preferred co-catalyst for use in the present invention is tri-isobutyl aluminium (TIBAL).

As used herein, the term "catalyst slurry" refers to a composition comprising catalyst solid particles that are in suspension. The term "concentrated catalyst slurry" refers to a composition comprising catalyst solid particles that are in suspension whereby the concentration of catalyst is at least higher than 10% by weight. The term "diluted catalyst slurry" refers to a composition comprising catalyst solid particles that are in suspension, whereby the concentration of catalyst is lower than or equal to 10% by weight.

The hereunder-described embodiments of an apparatus according to the present invention correspond to the required equipment for preparation and injection of one catalyst. If two or more (different) catalysts need to be fed to a reactor, two or more apparatuses according to the present invention can be supplied or a catalyst blend can be prepared and supplied using an apparatus according to the present invention.

In a first embodiment, the invention relates to an apparatus for controlling the injection of catalyst slurry in a polymerization reactor comprising
 one or more storage vessels for storing catalyst slurry consisting of solid catalyst in a hydrocarbon diluent, whereby each vessel is provided with means for transferring said catalyst slurry from said storage vessels to a mixing vessel,
 a mixing vessel, being connected with said storage vessels by means of said transferring means, for diluting said catalyst slurry to a suitable concentration for use in a polymerisation reaction, and
 one or more conduits, connecting said mixing vessel to a polymerization reactor for transferring said diluted catalyst slurry from said mixing vessel to said reactor, whereby each conduit is provided with a pumping means for pumping said slurry to said reactor.

This embodiment of the apparatus is in particular suitable for controlling the injection of metallocene catalyst slurry or chromium catalyst slurry in a polymerization reactor wherein polyethylene is prepared.

In a preferred embodiment said one or more conduits for transferring catalyst slurry from said storage vessels to said mixing vessel comprise a first conduit for transferring said catalyst slurry from a first storage vessel to a mixing vessel which is interchangeable with a second conduit for transferring said catalyst slurry from a second storage vessel to a mixing vessel through lines connecting said first means with said second means.

In a further preferred embodiment, said conduits for transferring said catalyst slurry from a storage vessel to a mixing vessel, each are provided with a metering valve, provided downstream the connecting lines.

This embodiment of the invention will be described hereunder with reference to the control of feeding of a metallocene catalyst supported on silica impregnated by methylaluminoxane (MAO), to a polymerisation reactor wherein ethylene is polymerised. In a preferred embodiment, isobutane is used as diluent for the metallocene catalyst. As co-catalyst for the metallocene catalyst, reference is made to a tri-isobutyl aluminium co-catalyst, referred to as TIBAL herein. However, it should be understood that the present device is applicable to other types of catalysts, such as for instance chromium catalysts, and to other types of co-catalysts as well.

Referring now to FIG. 1, an apparatus according to the present invention is illustrated. The apparatus comprises one or more catalyst storage vessels, or so-called mud tank or pot 2 which contain solid-liquid slurry of metallocene catalyst and isobutane diluent. The slurry is fed from the mud pot 2 through the combination of conduit 6, 7 and conduit 15 to a mixing vessel 3, wherein the slurry is diluted to a suitable concentration. In addition, the apparatus further comprises one or more conduits 4 which connect the mixing vessel 3 to a polymerization reactor 1 and through which the diluted catalyst slurry is pumped from said mixing vessel 3 to the reactor 1, by means of pumping means 5 provided in these conduits 4.

The metallocene catalysts can be provided under a dry form in commercially available drums or tote bins 26. In general such drums containing dry catalyst powder are not able to handle high pressures. For instance, the pressure in such drum may comprise approximately between 1.1 and 1.5 bar, and preferably 1.3 bar. Depending on the diluent used, it may be required to bring the catalyst under higher pressure conditions in the storage vessel 2. Using appropriate systems, the catalyst is therefore preferably transferred from such drums to a storage vessel 2, which is suitable for handling higher pressures, if this is required by the diluent. This is for instance the case when isobutane is used, since this diluent is only liquid at higher pressure levels. In case for instance hexane is used as diluent, storage vessel 2 is not required, since this diluent is liquid at low pressures. According to a preferred embodiment, the metallocene catalyst is provided from drums 26 to a storage vessel 2 through a conduit 27, preferably by means of nitrogen pneumatic transfer or by gravity. However, it is clear that also other types of catalyst feeding to the storage vessel are suitable and fall within the scope of the present invention. In an alternative embodiment, the metallocene catalyst can also be provided in a commercial container that is suitable for handling higher pressure comprised between 7 and 16 bar. In such case such commercial container is considered as a storage vessel 2 and the catalyst can be fed directly from this commercial container to a mixing vessel 3. Isobutane diluent is brought into the storage vessel 2 by means of a control valve.

In the storage vessel, the metallocene catalyst is stored under liquid olefin free isobutane pressure, preferably comprised between 7 and 16 bar. The pressure in the storage vessel is preferably lower than the pressure in the reactor, in order to avoid leakage of catalyst from the storage vessel to the reactor. Catalyst settles in storage vessel 2, since no agitation means are provided in this vessel.

The catalyst is subsequently transferred by means of transferring means from the storage vessels 2 to a mixing vessel 3 wherein said catalyst is diluted for obtaining a suitable concentration for use in a polymerisation reaction. Preferably the catalyst mixtures in the storage vessel 2 which contain proportionally high amounts of solids are fed to the mixing vessel 3 through conduits 6, 7. As represented, two storage vessels are connected with two different conduits 6, 7 to a common mixing vessel 3. In such case, the catalyst mixtures in conduits 6, 7 are preferably discharged in a common conduit 15, before being supplied to the mixing vessel 3. However, according to the invention, also only one storage vessel 2 may be provided. To avoid remaining catalyst in storage vessel 2, the vessel is flushed with isobutane, such that remaining catalyst is transferred to the mixing vessel 3.

In a particularly preferred embodiment, the conduits 6, 7 are interconnected by means of connecting lines 8. Such lines 8 enable that the different storage vessels 2 can be used in accordance with all provided conduits 6, 7. For instance, as represented in FIG. 1, in case two storage vessels 2 are provided, each having a conduit 6 or 7, the conduit 6 for transferring said catalyst from a first storage vessel 2 to a mixing vessel 3 is interchangeable with a second conduit 7 for transferring said catalyst from a second storage vessel 2 to a mixing vessel 3 through lines 8 connecting said first 6 with said second 7 conduit. Such interconnection permits, in case of interruption of catalyst transfer through one conduit 6, to discharge the catalyst to the mixing vessel 3 through a second conduit 7.

Each conduit 6, 7 is preferably equipped with metering valves 9 allowing the feeding of a controlled flow rate of catalyst to the mixing vessel 3. These valves are preferably provided downstream the connecting lines 8. The pressure difference between the storage vessel 2 and the mixing vessel 3 supplies the motive force to feed the catalyst to the mixing vessel.

The metering valves 9 allow the transfer of a predetermined volume of catalyst to the mixing vessel 3. The catalyst slurry discharged by the valves is carried to the mixing vessel by an isobutane flow. Therefore, the conduits 6, 7, each are preferably further provided with a port 24, which can be connected for flushing with diluent. Said port is preferably provided downstream the valves 9.

Figure 2:
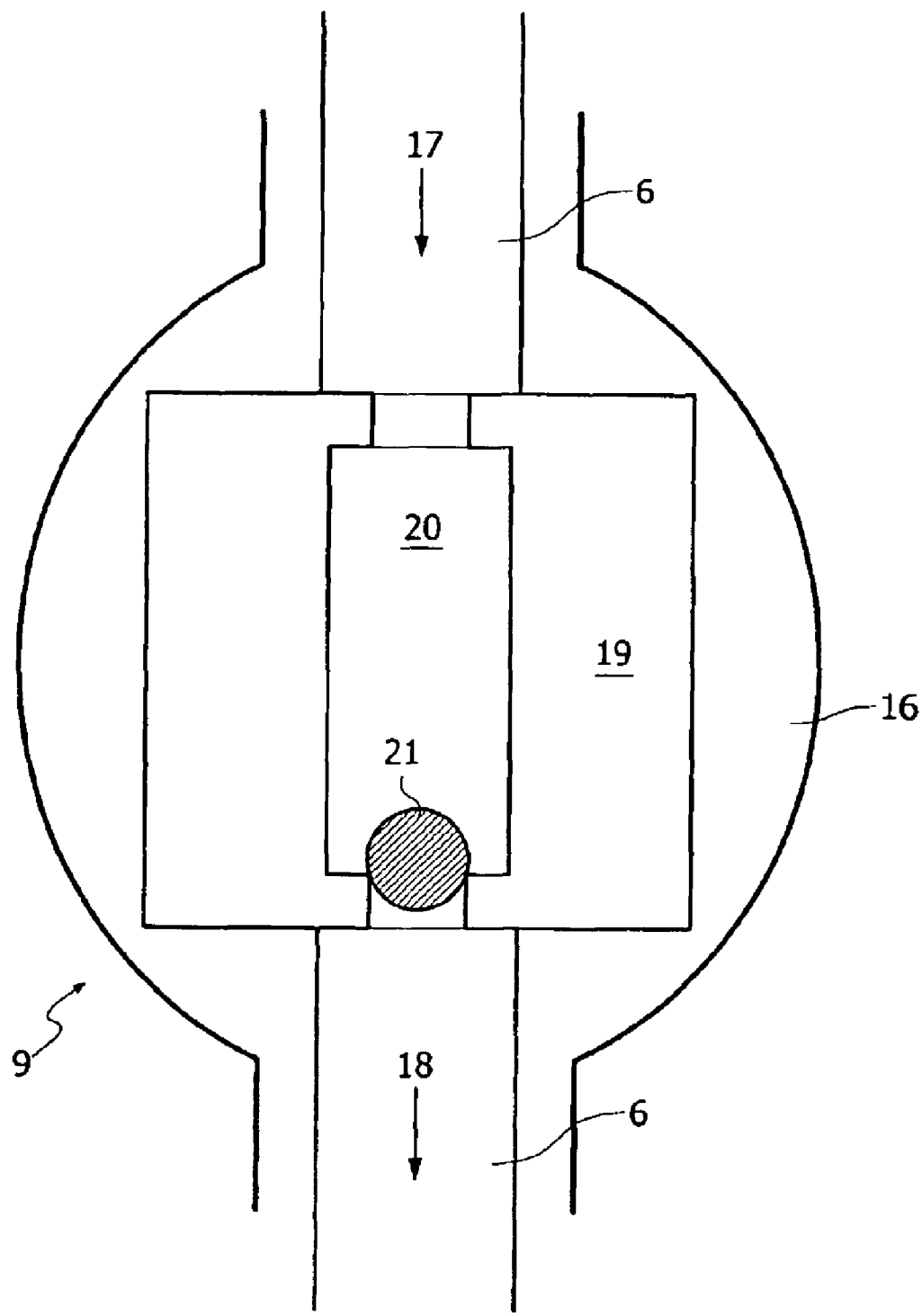
FIG. 2 is a detailed representation of a preferred embodiment of a metering valve, used in the apparatus according to the present invention for controlling the transfer of catalyst slurry from a storage vessel to a mixing vessel.

In a preferred embodiment, the metering valves 9 are ball check feeder or shot feeder valves. FIG. 2 illustrates a ball check feeder valve arrangement suitable for utilization in the present apparatus. However, it is clear that other types of valves could be used as well in accordance to the present invention. Referring to FIG. 2, a preferred embodiment of a valve is represented which includes a body 16, having an inlet 17 and an outlet 18, a member 19, containing a metering chamber 20, which is rotatable within the body 16 for communicating with the inlet 17 and outlet 18 in at least two positions, a ball shaped piston 21, which moves with a reciprocating motion within the chamber 20 as the member 20 is rotated. The working mechanism of such valve involves a sequence of charging, valve actuation and dumping of a specific volume of catalyst slurry from a storage vessel 2 to a mixing vessel 3. During operation, when the valve takes a first position, a fixed quantity of concentrated slurry flows through the inlet 17 and fills a chamber 20 within the valve 9. Said quantity is released to the mixing vessel 3 when the valve is actuated to a second position. The valve 9 thus delivers a fixed volume of concentrated slurry from storage vessel 2.

More in detail the mechanism of action of this special ball check valve 9 is the following. The valve 9 is charged or filled with a predetermined volume of a mixture of catalyst and diluent when in a first position. Periodically this ball check valve is actuated to a second position and this volume of the mixture is dumped from the valve into the mixing vessel 3. The ball check valve 9 is then recharged or refilled with the predetermined volume of the mixture in preparation for actuation back to the first position where the second volume of mixture is dumped from the valve 9 into the mixing vessel 3. Concentrated slurry flow from storage vessel 2 to the mixing vessel 3 is thus accomplished by the cyclic operation of the metering valve 9. The cycle time of the valves determines the catalyst flow rate to the mixing vessel 3. For instance, when this cycle time is increased, the flow rate of catalyst decreases.

Due to the high degree of dilution and the use of membrane pumps the catalyst feeding system from the storage vessel 2 to the mixing vessel 3 advantageously allows providing catalyst at a controlled flow rate to the mixing vessel 3. In addition, the feeding system permits to keep the concentration of catalyst slurry in the mixing vessel 3 at a substantially constant level, since catalyst flow regulated by the valve 9 to the mixing vessel 3 is dependent on the dosed amount (concentration) of catalyst and diluent in the mixing vessel 3. In a preferred embodiment of the invention the concentration of catalyst slurry in the mixing vessel is kept at a substantially constant level. According to the invention the ratio between diluent and catalyst is adequately controlled. This is enabled by adequate control of catalyst feeding from the storage vessel by means of the catalyst feeding system and metering valves 9, and by release of a suitable amount of isobutane to the mixing vessel.

Catalyst wastes can be sent to one or more dump vessels 28, which are preferably provided with stirring means 25 and contain mineral oil for neutralization and elimination of the wastes. The dump vessels are preferably connected by means of conduits 29 to the catalyst feeding conduits 6 or 7, upstream of the metering valves 9. The dump vessel 28 is preferably also connected to the mixing vessel 3, for transferring catalyst wastes by means of a conduit 23. The dump is provided with a heated vessel, e.g. steam jacket, where the isobutane is evaporated and sent to distillation or to the flare. In order to avoid the transfer of catalyst fragments when transferring the evaporated isobutane, guard filters are provided with the dump vessels 28. The dump vessels 28 are also provided with pressure controlling means for controlling the pressure in said vessels. The catalyst waste remaining after evaporation of the diluent is removed from the vessels 28, preferably by means of a draining system, provided at the bottom of the vessel 28, and the removed waste is discharged into drums and further destroyed.

According to the present invention, the metallocene catalyst is transferred from the storage vessels 2 to a mixing vessel 3. A stream of isobutane is provided to mixing vessel 3 through a valve which is operably located in conduits 6 and 7. An additional function of this stream is to dillute the concentrated slurry. The mixing vessel 3 can be operated either when full of liquid or not. Preferably, the mixing vessel 3 is operated full of liquid, since if there is an interphase with nitrogen the catalyst slurry might settle or stick to the walls in the vessel.

Preferably, the metallocene catalyst slurry is diluted in a hydrocarbon diluent in the mixing vessel 3 to a concentration between 0.1% and 10% by weight. More preferably the slurry is diluted in a hydrocarbon diluent to a concentration comprised between 0.1% and 4% by weight, more preferred between 0.1 and 1%, and even more preferred of 0.5% by weight. Preparing diluted slurry having these concentrations advantageously enables the further use of membrane pumps 5 for injecting the slurry in the reactor 1, as described into more detail below. The mixing vessel 3 is also provided with a stirrer 25 for maintaining the homogeneity of the slurry.

Dilute catalyst slurry is withdrawn from the mixing vessel 3 through one or more conduits 4 and provided through these conduits to a polymerization reactor 1. Each conduit 4 is provided with a pumping means 5, which controls the transfer and injection of the metallocene catalyst slurry into the reactors 1. In a particularly preferred embodiment, said pumping means are membrane pumps. The conduits 4 preferably leave the mixing vessel 3 in upward direction under an angle preferably superior to 10°, and more preferably superior to 30°. In addition, the conduit provided downwards the pumping means 5 conducts the catalyst slurry preferably downwardly, under an angle preferably superior to 10°. Such configuration improves the action of the pumping means 5 and also enables to avoid plugging in the pumping means 5 since under this configuration the slurry tends to settle away from the pumps 5 in case the pumps 5 are interrupted or stopped. However, it is to be understood that conducts which extend downwardly are not required if sufficient flushing of the conduit 4 can be obtained.

The conduits 4 are further provided with isobutane flushing means, either at the inlet 30, at the outlet 33 or at both sides of the membrane pumps 5, as illustrated on FIG. 1. Isobutane flushing means 30, 33 enable to flush isobutane through the conduit 4 and to keep the conduits 4 and the pumping means 5 unplugged. Preferably, there is continuous flushing of the conduit 4 downstream the membrane pump 5 to the reactor 1 by means of isobutane flushing means 33. The conduit 4 upstream the pump 5 may be flushed discontinuously, by means of isobutane flushing means 30. When different conduits 4 are provided for connecting the mixing vessel 3 to the reactor 1, generally, one conduit having one active pumping means 5 will be operative, while the other conduits 4 and pumping means 5 will not be operative but will be kept in stand by mode. In this latter case, the conduit 4 downstream the pump 5 will preferably be flushed with a suitable stream of diluent. The conduit 4 upstream the pump 5 may be discontinuously flushed. In addition, two-way valves 31 can be installed on the conduits 4, in order to never stop the pumping means 5.

It is important to correctly control the metallocene catalyst flow rate to the reactor and to pump catalyst slurry into the reactor at a controlled and limited flow rate. An unexpected flow rate to the reactor could lead to a runaway reaction. A fluctuating flow to the reactor could lead to reduced efficiency and fluctuations in product quality. Therefore, in a particularly preferred embodiment, the injection pump 5 flow rates are controlled by the reactor 1 activity. The pumping means are in particular controllable in function of the concentration of a reactant in said reactor. Preferably said reactant is the concentration of monomer, i.e. ethylene, in the reactor. However, it should be clear that the membrane pumps are controllable in function of the concentration of other reactants, such as e.g. the co-monomer or hydrogen concentrations in the reactor as well. By the use of membrane pumps 5 the invention provides for a good control catalyst flow. In particular, the metallocene catalyst flow rate to the reactors is controlled by adjusting the stroke and/or frequency of the membrane pumps. Furthermore, the pump flow rates are controlled by the ethylene concentration in the reactor. In case the ethylene concentration is high in the reactor, more catalyst will be added to the reactor and vice versa. In this way, the variations in ethylene polymerisation rate are taken into account and actual production rate and product properties do not fluctuate significantly. Variations in ethylene polymerisation rate are taken into account and polymerisation reactions under optimal catalyst feeding conditions can be obtained.

At the start of the operation of the above-described embodiment of an apparatus according to the invention, the following subsequent steps are performed. First, the mixing vessel 3 and the conduits provided under the valves 9 are filled with the diluent isobutane. Then, the storage vessels and the conduits 6 and connecting lines 8, provided upstream the valves 9, are supplied with isobutane. Subsequently, the valves 9 are shortly brought into operation, where after the flushing to the reactor 1 is opened and catalyst is injected through conduits 4 in the reactor.

In another embodiment, the invention relates to an apparatus for preparing and supplying catalyst to a polymerisation reactor comprising
- a (storage) vessel suitable for containing concentrated catalyst slurry comprising catalyst solid particles suspended in a mineral oil,
- a buffer vessel for diluting said catalyst slurry at a suitable concentration for use in a polymerisation reaction, said buffer vessel being in connection with said (storage) vessel by means of one or more conduits for transferring the concentrated catalyst slurry from said (storage) vessel to the buffer vessel and being provided with one or more conduits suitable for transferring the diluted catalyst slurry from said buffer vessel to said reactor,
- a pump provided on each of said conduits for transferring catalyst slurry from said vessel to said buffer vessel and
- a pump provided on each of said conduits for transferring diluted catalyst slurry from said buffer vessel to said reactor.

The above-referred embodiment of an apparatus according to the present invention is particularly suitable for being used for different types of catalysts, e.g. for chromium-type, metallocene as well as Ziegler-Natta catalysts, and in particular for catalyst which is provided as solid particles suspended in a mineral oil.

The present embodiment of an apparatus according to the invention enables to transfer concentrated catalyst slurry from the storage vessel to the buffer vessel before supplying the slurry to the reactor. Therefor, in another preferred embodiment, an apparatus is provided according to the invention wherein a pump is provided on the conduit for transferring concentrated catalyst slurry from the storage vessel to the buffer vessel which preferably comprises a progressive cavity pump. Such type of pump is particularly suitable for pumping significant amounts of solids, e.g. catalyst solid particles in mineral oil.

Moreover, the present invention provides an apparatus that enables to adjust catalyst flow to said reactor in function of the polymerisation reaction in said reactor. Therefor, in another preferred embodiment, the pump provided on the conduit for transferring the diluted catalyst slurry from said buffer vessel to said reactor comprises a membrane pump. Such pumps have the advantage that they allow the control of catalyst flow rate. Furthermore, such pumps can in particular be regulated in function of the concentration of a reactant in said reactor. Via a feed back mechanism, the membrane pumps are capable of being adjusted and of fine-tuning the catalyst flow rate to the reactor in function of the concentration of a reactant in said reactor.

In addition, the present apparatus has the advantage to be usable for different batches of catalyst. The apparatus does not need to be replaced every time a new commercial vessel comprising catalyst is to be connected to the system.

As mentioned above, the present embodiment of an apparatus according to the invention is particularly suitable for being used for different types of catalysts, e.g. for chromium-type, metallocene as well as Ziegler-Natta catalysts. This embodiment of the invention will however be described hereunder with reference to a method and apparatus for supplying a Ziegler-Natta catalyst, in particular a titanium tetrachloride ($TiCl_4$) catalyst to a polymerisation reactor wherein ethylene is polymerised. As co-catalyst for the Ziegler-Natta catalyst, reference is made to a tri-isobutyl aluminium co-catalyst. However, it should be clear that the present apparatus is applicable to other types of catalysts and co-catalysts as well, as indicated above.

Figure 3:
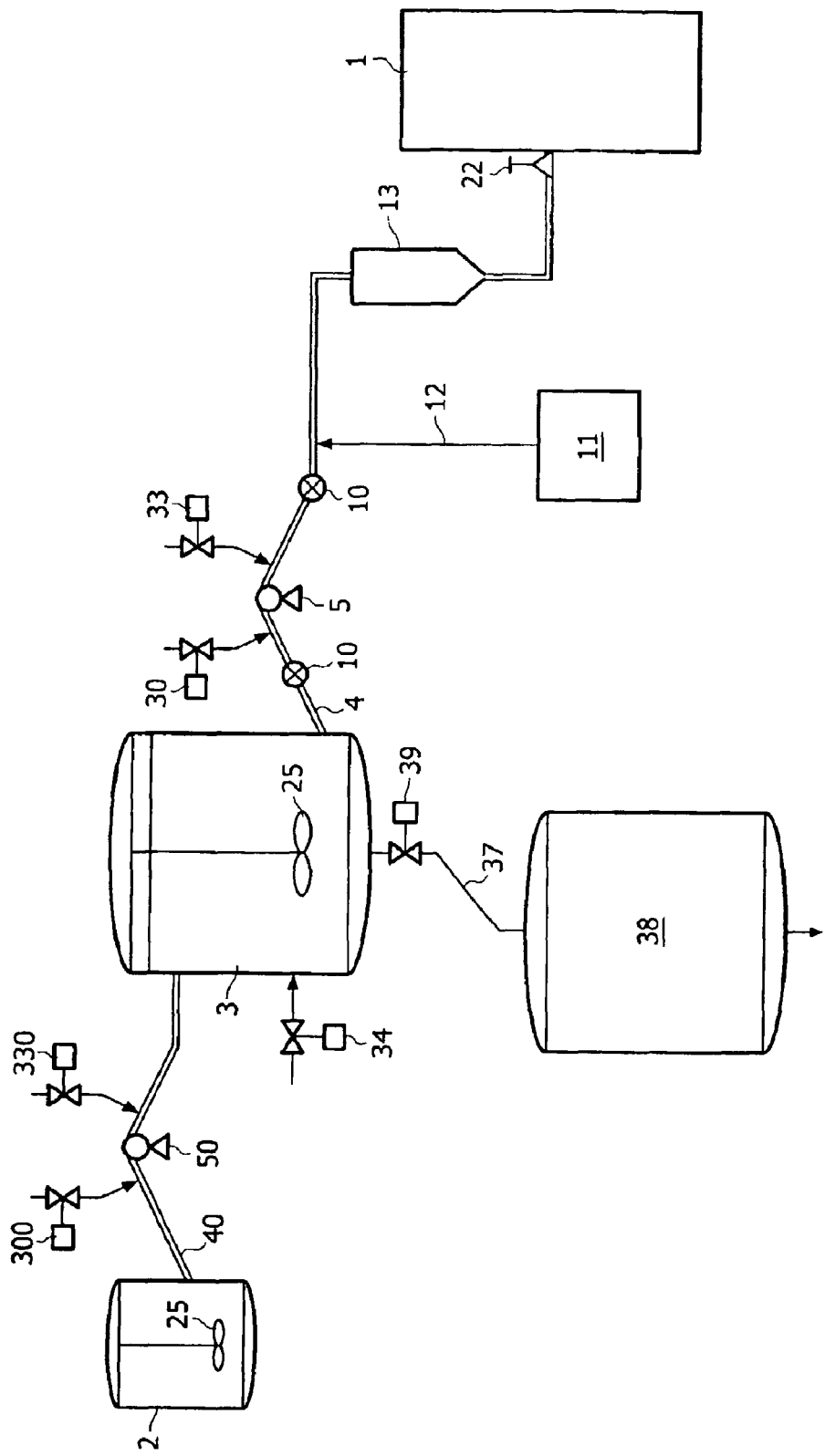
FIG. 3 is a schematic representation of another preferred embodiment of an apparatus according to the invention for preparing and supplying catalyst to a polymerisation reactor.

Referring to FIG. 3 a preferred embodiment of an apparatus according to the present invention is illustrated. In general, the apparatus according to the invention comprises a vessel 2 for receiving catalyst in oil suspension, and a buffer vessel 3 for preparing and storing diluted catalyst slurry at a suitable concentration for use in a polymerisation reaction. Concentrated catalyst slurry is transferred from the vessel 2 to the buffer vessel 3 through one or more conduits 40 by means of pumps 50, while diluted catalyst slurry is continuously transferred from the buffer vessel 3 to the reactor through one or more conduits 4 by means of pumps 5. The constructional details of valves, pumps etc. have been omitted in the drawings for clarity, it being within the skill of the art to supply these.

According to the present invention, the Ziegler-Natta catalyst $TiCl_4$ is provided as a suspension of solid particles in a mineral oil or hexane or heptane in a commercially available drum. It can also be supplied in dry form. The catalyst can be transferred to a vessel 2 from this commercial drum. According to an embodiment, the catalyst can be provided from such commercial drums to vessel 2 by means of nitrogen pneumatic transfer or by gravity. The catalyst concentration in vessel 2 can be adjusted by adding mineral oil; alternatively other hydrocarbons can be used.

In general, the pressure in the vessel 2 may comprise approximately between 7 and 16 bar. The slurry in the vessel 2 is referred to as "concentrated" or "heavy" slurry since it contains a proportionally high amount of particulate catalyst solids. Such concentration preferably ranges from 10 to 50% by weight, and even more preferred from 20 to 40% by weight.

According to a preferred embodiment, the concentrated Ziegler-Natta catalyst is transferred from vessel 2 to the buffer vessel 3, wherein the catalyst is diluted to a concentration suitable for use in the polymerisation reactor. The buffer vessel 3 therefore is provided with means 34 for supplying a suitable diluent to said buffer vessel 3. The concentrated catalyst supplied to the buffer vessel 3 through conduit 4 is diluted by the diluent supplied through conduit 34 to obtain diluted catalyst slurry in the buffer vessel 3. The buffer vessel 3 can be operated either when full of liquid or not. Preferably, the buffer vessel 3 is operated when full of liquid, since if there is an interphase with nitrogen the catalyst slurry might stick to the walls settle in the vessel.

When using $TiCl_4$ as catalyst, hydrocarbons such as hexane or isobutane can be used to dilute the catalyst and to obtain diluted catalyst slurry. However, a major disadvantage of using hexane as diluent to prepare the catalyst is that a portion of hexane generally ends up in the final polymer product, which is undesirable. Isobutane on the other hand is easier to handle, to purify and to re-use in the polymerisation process than hexane. For instance, since in the polymerisation process of ethylene, isobutane is applied as diluent in the reaction, isobutane used as diluent for the catalyst can easily be re-used in the polymerisation process. Therefore, in a preferred embodiment, isobutane is used as diluent for the $TiCl_4$ catalyst. Isobutane is generally present in gas form at room temperature and at atmospheric pressure. In other to obtain liquid isobutane for preparing the diluted catalyst slurry, the buffer vessel 3 is preferably operated at pressure levels comprised between 8 and 17 bar, and preferably at pressure levels comprised between 4 and 5 bar. The pressure in the buffer vessel 3 is preferably lower than the pressure in the reactor, in order to avoid leakage of catalyst from the buffer vessel to the reactor.

Before transferring the Ziegler-Natta catalyst from the vessel 2 to the buffer vessel 3, isobutane is admitted into the vessel 3. The vessel 3 is provided with an inlet system 34 for supply of this diluent. The vessel 2 and the buffer vessel 3 are agitated by means of stirring or mixing means 25 provided in said vessel to maintain the homogeneity of the concentrated and diluted catalyst slurry, respectively. The buffer vessel 3 is preferably large enough to contain sufficient catalyst slurry and large enough such that a day vessel capacity is equivalent to the time to prepare a new batch. This enables to assure the continuous production and availability of the catalyst in the polymerisation reaction. Alternatively, a second vessel 2 can be provided to prepare a new batch.

The slurry in the buffer vessel 3 is referred to as "diluted" slurry since it contains a proportionally low amount of particulate catalyst solids. The diluted slurry has a concentration comprised between 0.1 and 10% by weight, and preferably comprised between 0.1 and 5% by weight, and even more preferred between 0.5 and 4% by weight. Preparing diluted catalyst slurry having these concentrations advantageously enables the further use of diaphragm pumps 5 for injecting the diluted catalyst slurry in the reactor 1, as described into more detail below. In case other concentrations of catalyst slurry would be applied, it is clear that other types of pumps can be applied.

The transfer of the Ziegler-Natta catalyst from the vessel 2 to the buffer vessel 3 is preferably done through one or more conduits 40. For transfer of Ziegler-Natta catalyst from the vessel 2 to the buffer vessel 3 a pump 50 is provided on each conduit 40. In a preferred embodiment, said pump 50 comprises a pump which is suitable for pumping liquids with significant amounts of solids, e.g. solid particles in crude oil, which would otherwise easily damage more common types of reciprocating oil well pumping systems. Examples of pumps of this type are commonly known as Moineau pumps or progressive cavity pumps, and are available commercially. Such progressive cavity pumps operate on the Moineau principle, which is based on the geometrical fit between the rotating element (rotor), and the stationary element (stator). The interference fit between the rotor and the stator creates a series of sealed chambers called cavities. Pumping action is achieved by the rotor turning eccentrically within the stator. Fluid enters the cavity formed at the inlet and progresses within that cavity to the outlet. The result is a positive displacement, non-pulsating flow that is directly proportional to the pump's speed. This allows the progressive cavity pump to deliver material at a wide range of flow rates from small shots to continuous flow.

As represented in FIG. 3, the conduits 40 preferably leave the vessel 2 in upward direction under an angle preferably superior to 10°, and more preferably superior to 30°. In addition, the conduits 40 provided downwards the pumping means 50 conducts the catalyst slurry preferably downwardly, under an angle preferably superior to 10°. Such configuration improves the action of the pump 50 and also enables to avoid plugging in the pump 50 since under this configuration the concentrated catalyst slurry tends to settle away from the pumps 50 in case the pumps 50 are interrupted or stopped.

The conduits 40 are further preferably provided with a pulsation dampener, safety valves and isobutane flushing means 300, 333, either at the inlet, at the outlet or at both sides of the slurry pumps 50, as illustrated on FIG. 3. Isobutane flushing means 300; 330 enable to flush isobutane diluent through the conduit 40 and to keep the conduits 40 and the pumps 50 unplugged. On conduits 300, 330 for injecting isobutane flow measuring means can be provided. When different conduits 4 are provided for connecting the vessel 2 to the buffer vessel 3, generally, one conduit having one active pump 50 will be operative, while the other conduits 40 and pumps 50 will not be operative but will be kept in stand by mode.

The concentrated slurry is preferably injected in ratio control of isobutane diluent to catalyst in the buffer vessel to have a constant concentration of slurry in the buffer vessel. In addition, the conduits 40 can be further provided with flow measuring means for easily measuring the flow rate of the concentrated catalyst slurry in the conduits 40. The ratio of catalyst to diluent is adequately controlled and adjusted by controlling the speed of the pump 50 and by measuring the density of the isobutane diluent.

Catalyst wastes can be sent through conduit 37, which is provided with a valve 39, to one or more dump vessels 38, which are preferably provided with stirring means and contain mineral oil for neutralization and elimination of the wastes. Preferably said dump vessel 38 is larger than the buffer vessel 3. In case of the preparation of unsuitable catalyst, these can be emptied from the vessels 3 to these dump vessels 38. The dump vessel 38 is preferably a heated vessel, having a steam jacket, where the diluent, i.e. isobutane, is evaporated. The steam jacket is preferred, for desorbing isobutane. The evaporated diluent is sent to distillation or to the flare. In order to avoid the transfer of catalyst fragments when transferring the evaporated diluent, guard filters are provided with the dump vessels 38. The dump vessels 38 are also provided with pressure controlling means for controlling the pressure in said vessels. The catalyst waste remaining after evaporation of the diluent is removed from the vessels 38, preferably by means of a draining system, provided at the bottom of the vessel 38, and the removed waste is discharged into drums and further destroyed.

The diluted Ziegler-Natta catalyst slurry is subsequently transferred from the buffer vessel 3 to the reactor 1 through one or more conduits 4. The conduits 4 preferably have an inner diameter comprised between 0.3 and 2 cm, and preferably between 0.6 and 1 cm. Each conduit 4 is provided with a pump 5, which controls the transfer and injection of the diluted Ziegler-Natta catalyst slurry into the reactors 1. In a particularly preferred embodiment, said pumps are diaphragm pumps.

As represented in FIG. 3, the conduits 4 preferably leave the buffer vessel 3 upwardly under an angle preferably superior to 10°, and more preferably superior to 30°. In addition, the conduit 4 provided downwards the pump 5 conducts the diluted catalyst slurry downwardly, under an angle preferably superior to 10°. Such configuration improves the action of the pump 5 and also enables to avoid plugging in the pump 5 since under this configuration the diluted catalyst slurry tends to settle away from the pumps 5 in case the pumps 5 are interrupted or stopped.

The conduits 4 are further provided with a pulsation dampener, safety valves and isobutane flushing means 30, 33 either at the inlet, at the outlet or at both sides of the diaphragm pumps 5. Isobutane flushing means 30, 33 enable to flush isobutane through the conduit 4 and to keep the conduits 4 and the pump 5 unplugged. Preferably, there is continuous flushing of the conduit 4 downstream the membrane pump 5 to the reactor 1 by means of isobutane flushing means. The conduit 4 upstream the pump 5 may be flushed discontinuously, by means of isobutane flushing means. When different conduits 4 are provided for connecting the buffer vessel 3 to the reactor 1, generally, one conduit having one active pumps 5 will be operative, while the other conduits 4 and pump 5 will not be operative but will be kept in stand by mode. In this latter case, the conduit downstream the pump 5 will preferably be flushed with a suitable stream of diluent. The conduit upstream the pump 5 may be discontinuously flushed.

In order to reduce the risk of leakage, the catalyst should be stored at a lower pressure than the reactor that is generally comprised around 43 bar, e.g. stored in the buffer vessel 3 at approximately 6-16 bar. The pressure in the conduits 4 downstream of the pumps 5 is preferably comprised between 45 and 65 bar. This elevated pressure, in comparison with the pressure values provided in the vessel 2 and the buffer vessel 3, is required in order to bring the diluted catalyst under sufficient pressure into the reactor.

It is important to control correctly the catalyst flow to the reactor and to pump catalyst slurry into the reactor at a controlled and limited flow. An unexpected flow to the reactor could lead to a runaway reaction. A fluctuating flow to the reactor could lead to reduced efficiency and fluctuations in product quality. Therefore, in a particularly preferred embodiment, the injection pump 5 flow rates are controlled by the reactors' 1 activity. The pumps are in particular controllable in function of the concentration of a reactant in said reactor. Preferably said reactant is the concentration of monomer, i.e. ethylene, in the reactor. However, it should be clear that the membrane pumps are controllable in function of the concentration of other reactants, such as e.g. the co-monomer or hydrogen concentrations in the reactor as well. By the use of membrane pumps 5 the invention provides for a good control of the diluted catalyst flow. In particular, the catalyst flow rate to the reactors is controlled by adjusting the stroke and/or frequency of the diaphragm pumps. Furthermore, the pump flow rates are controlled by the ethylene concentration in the reactor. In case the ethylene concentration is high in the reactor, more catalyst will be added to the reactor and vice versa. In this way, the variations in ethylene polymerisation rate are taken into account and actual production rate and product properties do not fluctuate significantly.

In a further embodiment, the apparatus according to the present invention is further provided with a co-catalyst distribution system, for bringing a suitable amount of co-catalyst into contact with the catalyst slurry for a suitable period of time before supplying said catalyst slurry to said reactor. When using a metallocene catalyst, triisobutyl aluminium (TIBAL) is preferably used as co-catalyst-. When using a Ziegler-Natta catalyst, triisobutyl aluminium (TIBAL) is preferably used as co-catalyst.

Referring to FIG. 1 or FIG. 3, the co-catalyst distribution system 11 may comprise two co-catalyst storage vessels wherein co-catalyst is prepared and stored. One vessel may be in connection to the conduit 4 for providing co-catalyst thereto.

Co-catalyst wastes can be sent to a dump vessel, which is preferably provided with stirring means and contains mineral oil for neutralization and elimination. The dump is provided with a heated vessel, e.g. steam jacket, where the isobutane is evaporated and sent to distillation or to the flare.

Co-catalysts are generally provided in commercial drums. In a storage vessel of the co-catalyst distribution system 11, the TIBAL co-catalyst is generally provided in a solution of hexane or heptane, but can be provided in pure form too. The TIBAL co-catalyst is transferred from the storage vessel through a co-catalyst injection conduit 12, in the conduit 4, which connects the mixing vessel 3 with the reactor 1. Conduit 12 intersects conduit 4, downstream the diaphragm pumps 5 and upstream the reactor 1. In case a flow measuring means 10 is further provided on the conduits 4, the co-catalyst feeding conduit 12 preferably intersects the conduit 4, downstream of said flow meter 10 and upstream the reactor 1.

The contact time between the Ziegler-Natta/metallocene catalyst and the TIBAL co-catalyst znd the ratio between the Ziegler-Natta/metallocene catalyst and the TIBAL co-catalyst have an important influence on the granulometry but also on the activity of the final polymerisation product. Using a TIBAL co-catalyst, bigger polyethylene particles can be obtained through activity. Also, pre contact of the TIBAL co-catalyst with the catalyst improves the bulk density and the settling efficiency of the polyethylene prepared in the polymerisation reactor. According to the invention a suitable amount of TIBAL co-catalyst is injected in the conduits 4, downstream the diaphragm pumps 5, before entering the reactors 1.

In case the TIBAL co-catalyst is injected in the conduit 4, the injection point is at a distance from the reactor allowing a certain pre-contact time with the catalyst before being supplied to the reactor. In order to have a sufficient pre-contact time, preferably between 5 seconds and 1 minute, between the metallocene catalyst slurry and the TIBAL co-catalyst, each conduit 4 is provided with a contact vessel 13, preferably downstream the injection point of the co-catalyst distribution system, for enhancing the contact time of said co-catalyst with said catalyst slurry in the conduits 4. These contact vessels 13 can be agitated or not. In another preferred embodiment, the conduits 4 have an inner diameter comprised between 0.3 and 2 cm, and preferably comprised between 0.6 and 1 cm while the diameter of the contact vessels 13 is preferably comprised between 1 and 15 cm and preferably between 6 and 9 cm.

In addition, in various embodiments of an apparatus according to the invention conduits 4 are provided which are further provided with measuring means 10, for easily measuring the catalyst flow rate in the conduits 4. These flow measuring means 10 preferably are Coriolis flow measuring means. The means 10 can be provided between the mixing vessel 3 and the membrane pumps 5 or downstream from said pumping means 5. Preferably, said means 10 are provided upstream of the co-catalyst injection conduit 12. The slurry is preferably injected in ratio control of isobutane diluent to catalyst. The ratio of catalyst to diluent is adequately controlled and adjusted by controlling the speed of the pump 5 and by measuring the density of the isobutane diluent. The Coriolis meters 10 can measure the flow and the density of the catalyst slurry at the exit of the mixing vessel 3 and indirectly determine the suspended solids concentration. A correlation exists for estimating the concentration of suspended solids based on the slurry density, the carrier fluid density and the solid particle density.

In another embodiment, measuring means 10, and preferably Coriolis flow measuring means, can also be provided in conduits 40 between the storage vessel 2 and the mixing vessel 3, i.e. upstream or downstream of the membrane pumps 50 in these conduits 40.

In another embodiment, the catalyst slurry is injected under controlled flow rate into the reactor. The conduits 4 for transferring catalyst slurry into to the reactor are equipped by one or more valves, preferably piston valves 22. The piston valves 22 are capable of sealing the orifice by which the conduit 4 is connected to the reactor 1. When using different conduits 4 for transferring catalyst slurry to one reactor, only in one conduit 4 the pumps actively pump catalyst slurry to the reactor, while in other conduits 4 the pumps are not active and the conduits are preferably flushed by isobutane.

For reasons of brevity and clarity, conventional auxiliary equipment such as pumps, additional valves, and other process equipment have not been included in this description and the accompanying drawings as they play no part in the explanation of the invention. Also additional measurement and control devices which would typically be used on a polymerization process have not been illustrated.

It is clear from the present description that numbers and dimensions of the different parts of the apparatus according to the present invention relate to the size of the polymerisation reactors and can be changed in function of the reactor sizes.

In another preferred embodiment, by operation in accordance with the present invention, all lines, vessels, pumps, valves, etc. can be kept free of clogging by means of flushing or purging with nitrogen or diluent, i.e. isobutane. It is to be understood that where necessary flushing and purging means and lines are available on the device according to the invention in order to avoid plugging, or blocking.

It is clear from the present description that numbers and dimensions of the different parts of the apparatus according to the invention relate to the size of the polymerization reactors and can be changed in function of the reactor sizes.

It is to be understood from the present invention that all indicated pressures values are preferred pressure values, which in general can deviate from the indicated pressure values with approximately ±1 bar. It will be evident from the present description that all indicated pressure values in the vessels, conduits, etc. are values that are lower than the pressure value in the polymerisation reactor.

In another preferred embodiment, it is to be understood that all lines or conduits applied in accordance with the present invention may be provided, where necessary with flow measuring means.

The apparatuses according to the invention can be applied for feeding a single polymerisation reactor. In a preferred embodiment the apparatus according to the invention is applied for feeding a polymerisation reactor consisting of two liquid full loop reactors, comprising a first and a second reactor connected in series by one or more settling legs of the first reactor connected for discharge of slurry from the first reactor to said second reactor. Such in series connected reactors are particularly suitable for the preparation of bimodal polyethylene. The present apparatus can be applied for both reactors. The number of conduits 4 can be divided between the first and the second reactor. It is also possible to use two or more apparatuses according to the invention, e.g. when two or more different catalysts are used. In a preferred embodiment, the apparatus according to the invention can be used in a single loop reactor as depicted on FIG. 4 or in a double loop reactor, as depicted on FIG. 5.

Figure 4:
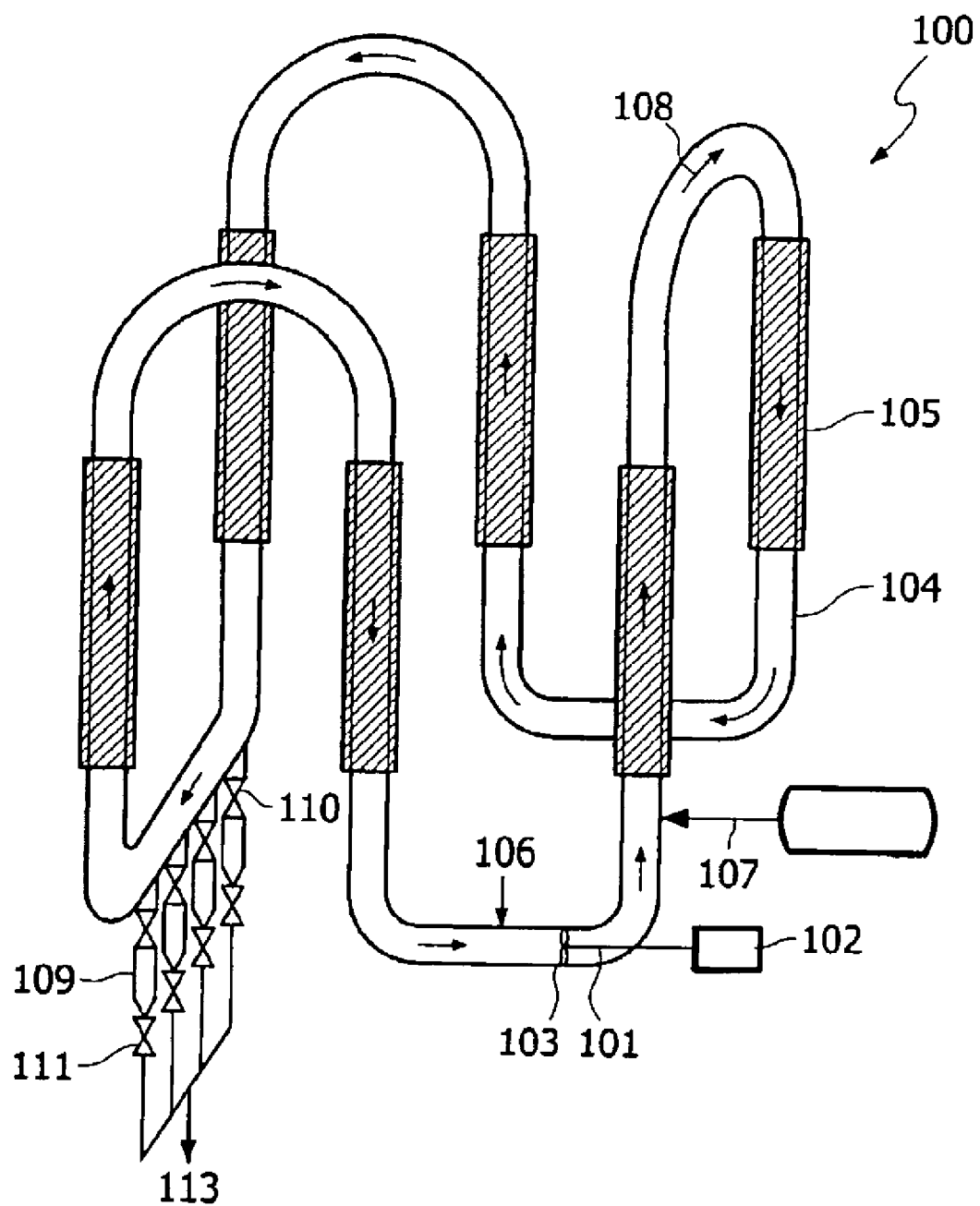
FIG. 4 is a schematic representation of a single loop polymerization reactor.

FIG. 4 represents a single loop reactor 100, consisting of a plurality of interconnected pipes 104. The vertical sections of the pipe segments 104 are preferably provided with heat jackets 105. Polymerization heat can be extracted by means of cooling water circulating in these jackets of the reactor. Reactants are introduced into the reactor 100 by line 107. Catalyst, optionally in conjunction with a co-catalyst or activation agent, is injected in the reactor 100 by means of the conduit 106. The polymerization slurry is directionally circulated throughout the loop reactor 100 as illustrated by the arrows 108 by one or more pumps, such as axial flow pump 101. The pump may be powered by an electric motor 102. As used herein the term "pump" includes any device from compressing driving, raising the pressure of a fluid, by means for example of a piston or set of rotating impellers 103. The reactor 100 is further provided with one or more setting legs 109 connected to the pipes 104 of the reactor 100. The settling legs 109 are preferably provided with an isolation valve 110. These valves 110 are open under normal conditions and can be closed for example to isolate a settling leg from operation. Further the settling legs can be provided with product take off or discharge valves 111. The discharge valve discharge of polymer slurry, when it is fully open. Polymer slurry settled in the settling legs 109 may be removed by means of one or more product recovery lines 113, e.g. to a product recovery zone.

Figure 5:
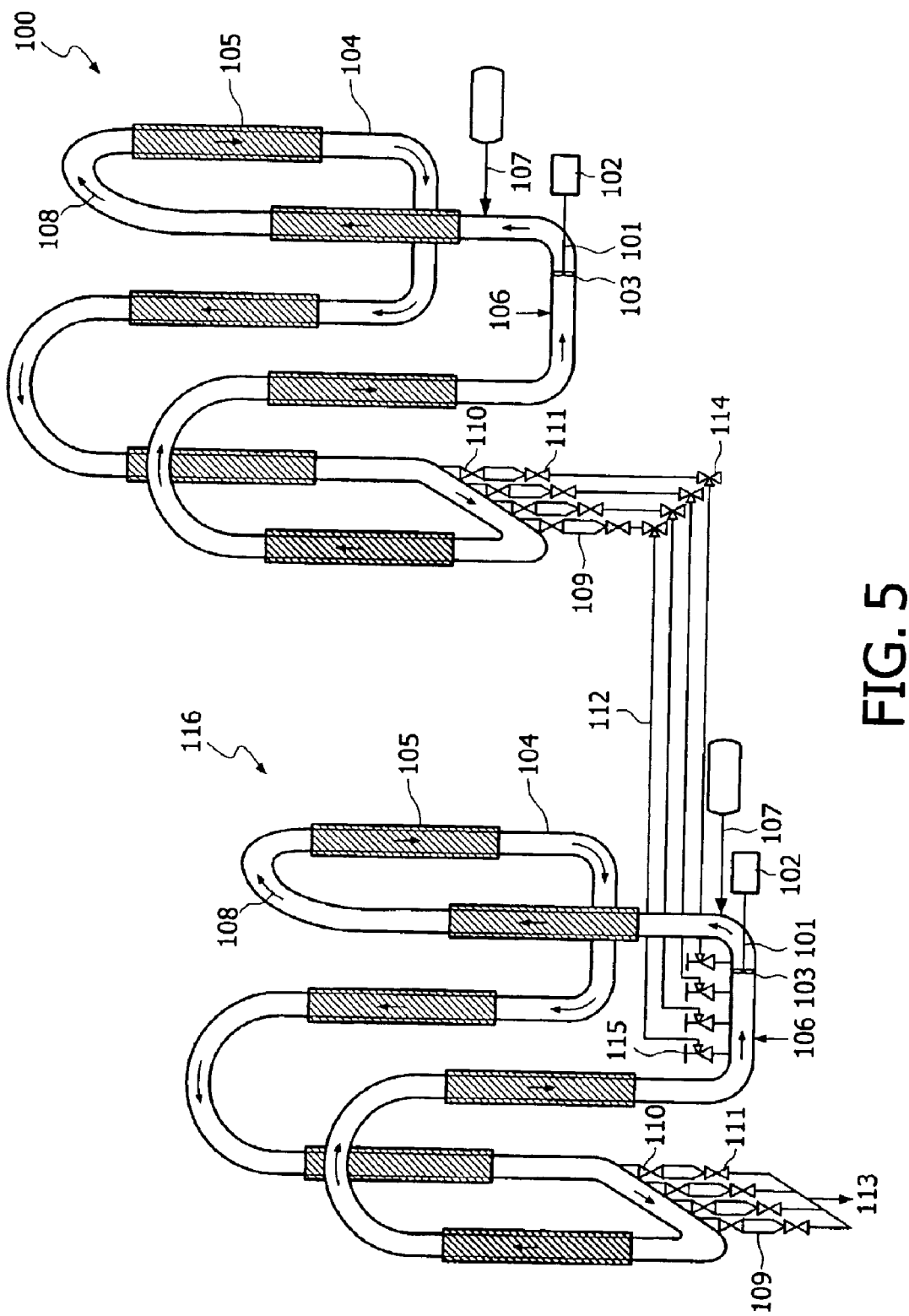
FIG. 5 is a schematic representation of a double loop polymerization reactor.

FIG. 5 represents a double loop reactor 100/116, comprising two single loop reactors 100 and 116, which are interconnected in series. Both reactors 100, 116 consist of a plurality of interconnected pipes 104. The interconnected pipes may be interconnected by a valve 111, which may be any type of valve, which can permit continuous or periodical sections of the pipe segments 104, which are preferably provided with heat jackets 105. Reactants are introduced into the reactors 100 by line 107. Catalyst, optionally in conjunction with a coatalyst or activation agent, is injected in the reactor 100 or 116 by means of the conduct 106. The polymerization slurry is directionally circulated throughout the loop reactors 100, 116 as illustrated by the arrows 108 by one or more pumps, such as axial flow pump 101. The pumps may be powered by an electric motor 102. The pumps may be provided with a set of rotating impellers 103. The reactors 100, 116 are further provided with one or more settling legs 109 connected to the pipes 104 of the reactors 100, 116. The settling legs 109 are preferably provided with an isolation valve 110. Further the settling legs can be provided with product take off or discharge valves 111. Downstream the valve 111 at the exit of the settling leg 109 of reactor 100, a three-way valve 114 is provided which allows to transfer polymer slurry settled in the settling legs 109 to the other reactor 116, by means of the transfer line 112. The transfer line 112 connects the three-way valve 114, provided at the exit of the settling leg 109 of one reactor 100, with the entry in the other reactor 116, where preferably a piston valve 115 is provided. Polymer slurry settled in the settling legs 109 of reactor 116 can be removed by means of one or more product recovery lines 113, e.g. to a product recovery zone.

The present invention further relates to methods for optimising the supply of a catalyst slurry to a polymerisation reactor wherein polyethylene, and preferably bimodal polyethylene, is prepared.

In one embodiment, the present invention relates to a method for controlling the injection of catalyst slurry in a polymerization reactor 1 wherein polyethylene is prepared, said catalyst consisting of solid catalyst, preferably a metallocene catalyst defined as described above in a hydrocarbon diluent, preferably isobutane. However, it is clear that the present method is also suitable for controlling the injection of chromium catalyst slurry in a polymerization reactor 1. The method comprises the subsequent steps of: a) providing solid catalyst and a hydrocarbon diluent in one or more storage vessels 2 such that a catalyst slurry is obtained in said vessel 2, b) transferring said catalyst slurry from said storage vessel 2 to a mixing vessel 3 wherein said catalyst slurry is diluted for obtaining a suitable concentration for use in a polymerisation reaction, and c) pumping said diluted catalyst slurry at a controlled flow rate from said mixing vessel 3 to said polymerisation reactor 1 through one or more conduits 4, by means of a pumping means 5, provided in each of said conduits 4. Such method is particularly suitable for optimising the supply of metallocene or chromium catalyst to a polymerisation reactor 1.

According to a preferred embodiment as illustrated on FIG. 1, the method comprises transferring said catalyst slurry from a storage vessel 2 to a mixing vessel 3 at a con trolled flow rate, by controlling the ratio between diluent and catalyst in the mixing vessel 3. Control of the flow rate is enabled by providing a catalyst feeding system for feeding catalyst slurry from the storage vessel 2 to the mixing vessel 3, which comprises a conduit 6, 7, connected to said vessel 2 and metering valves 9, preferably ball check feeder or shot feeder valves, on said conduit 6, 7. The catalyst flow from the storage vessel 2 to the mixing vessel 3 is regulated by the valves 9 and is dependent on the dosed amount (concentration) of catalyst and diluent in the mixing vessel 3. The ratio between diluent and catalyst is adequately controlled. This is enabled by adequate control of catalyst supply from the storage vessel 2 by means of the catalyst feeding system and metering valves 9, and by release of a suitable amount of isobutane diluent in the mixing vessel 3 through conduits 24. The amount of isobutane diluent can also be controlled using the catalyst concentration determined from the density measurement by Coriolis meter 10.

In another embodiment as illustrated on FIG. 3, the present invention relates to a method for optimising catalyst supply to a polymerisation reactor 1 comprising the steps of a) transferring concentrated catalyst slurry from a vessel 2 to a buffer vessel 3, said concentrated catalyst slurry comprising catalyst solid particles suspended in a mineral oil, b) diluting said catalyst slurry in said buffer vessel 3 by supplying a suitable diluent in said buffer vessel 3 whereby diluted catalyst slurry is obtained having a suitable concentration for use in a polymerisation reaction, and c) transferring said diluted catalyst slurry from said buffer vessel 3 to said reactor 1 at a suitable flow rate. Such method is particularly suitable for optimising the supply of Ziegler-Natta catalyst $TiCl_4$ to a polymerisation reactor 1, whereby the Ziegler-Natta catalyst $TiCl_4$ is provided in a commercial container 2 and transferred to vessel 3 as a suspension of solid particles in a mineral oil. The methods according to the present invention comprise the step of transferring concentrated catalyst slurry from a vessel 2 to a buffer vessel 3 through conduits 40 provided with pumps 50, preferably progressive cavity pumps.

In another preferred embodiment, the methods according to the present invention comprise diluting the catalyst slurry to a suitable concentration with hydrocarbon diluent, preferably isobutane, in the mixing vessel 3 to a concentration comprised between 0.1 and 10% by weight and more preferred having a concentration comprised between 0.1 and 5% by weight, and even more preferred between 0.5 and 4% by weigh. For instance the slurry is diluted in a hydrocarbon diluent to a concentration comprised between 0.1 and 4% by weight and more preferred between 0.1% and 1.0% by weight, and even more preferred of 0.5% by weight. Preparing diluted slurry having these concentrations advantageously enables the further use of membrane pumps (diaphragm pumps) 5 for injecting the slurry in the reactor 1. The use of such pumps advantageously enables to precisely and adequately control the flow of catalyst slurry injection in the reactor. The amount of isobutane diluent can be controlled using the catalyst concentration determined from the density measurement by Coriolis meter 10.

In yet another embodiment, the methods according to the present invention also comprise diluting the catalyst slurry to a suitable concentration with hydrocarbon diluent, preferably isobutane, by injecting said diluent in the conduits connecting the storage vessel 2 with the mixing vessel 3. According to this embodiment, the concentrated catalyst slurry is diluted while being transferred from the storage vessel to a mixing vessel, wherein the diluted catalyst is maintained and optionally further diluted.

In another embodiment, the methods according to the invention comprise controlling the flow rate of the catalyst slurry to the reactor 1 by determining the concentration of a reactant in said reactor 1. Preferably said reactant is the concentration of monomer, i.e. ethylene, in the reactor. However, it should be clear that also determination of other reactants, such as e.g. the co-monomer or the diluent concentrations in the reactor, is comprised within the scope of the present invention. Practically, this mechanism is obtained by providing each conduit for transferring and supplying the catalyst slurry from the buffer vessel to the reactor with a membrane pump that is capable of being adjusted and regulating the catalyst flow rate in function of the concentration of a reactant in said reactor.

In certain cases it might be required or advantageous to bring the catalyst into contact with a co-catalyst, as indicated above. Therefore, the present invention further provides methods comprising the step of bringing a co-catalyst into contact with said catalyst slurry before supplying said catalyst slurry to said reactor. The present methods provide a better contact and formation of a co-catalyst-catalyst mixture then in the case when co-catalyst is directly supplied to a reactor. Supply of a suitable co-catalyst-catalyst mixture to the reactor provides a more controlled and more uniform level of polymerisation reactivity in the reactor. Also, pre-contact between catalyst and co-catalyst positively influences the granulometry of the final polymerisation product and improves the bulk density and the settling efficiency of the polymerisation product prepared in the polymerisation reactor. Such methods also enable to more precisely control the ratio of catalyst-co-catalyst injection.

In a preferred embodiment, the methods comprise bringing a co-catalyst, preferably a co-catalyst as defined above, into contact with said diluted catalyst slurry present in conduits 4. The co-catalyst distribution system 12 preferably comprises at least one storage vessel and a conduit 11 intersecting the conduit 4, as illustrated in FIG. 1 and FIG. 3. In another preferred embodiment, the methods further comprise enhancing the contact time and the pre-contact of said co-catalyst with said catalyst slurry in conduits 4, by locally enhancing the volume of said conduits 4. Pre-contact between catalyst and co-catalyst positively influences the granulometry of the final polymerisation product and improves the bulk density and the settling efficiency of the polymerisation product prepared in the polymerisation reactor. During the activation process, if too much co-catalyst contacts the catalyst particle, the catalytic activity is not only reduced, but actual harm may result. The present methods also advantageously enable to more precisely control the ratio of catalyst/co-catalyst injection. By locally enhancing the volume of the conduits, a better pre-contact between co-catalyst and catalyst is obtained. The local enhancement of the volume is obtained by providing a contact vessel 13 in each conduit 4. Said vessels 13 have a diameter with is considerably larger than the diameter of the conduits 4.

In another preferred embodiment, the present invention provides methods for continuously supplying catalyst slurry from the buffer vessel 3 to the reactor 1 through conduits 4 at a suitable flow rate. The present invention provides methods that enable to continuously supply catalyst to a reactor, without interruption of the catalyst flow. By this mechanism continuous supply of catalyst slurry without relevant fluctuations to a polymerisation reactor is ensured, which will increase the efficiency of the polymerisation reaction in the reactor.

In yet another preferred embodiment, the invention relates to methods wherein catalyst flow rate to the reactor is accurately measured, through liquid flow rate measurement, using flow measuring means, such as preferably Coriolis flow measuring means.

The present invention also relates to the use of an apparatus according to the present invention for preparing and optimising the supply of a Ziegler-Natta catalyst to a polymerisation reactor wherein polyethylene, and preferably bimodal polyethylene, is prepared.

The present invention also relates to the use of an apparatus according to the present invention for preparing and optimising the supply of a metallocene catalyst to a polymerisation reactor wherein polyethylene, and preferably bimodal polyethylene, is prepared.

The present invention also relates to the use of an apparatus according to the present invention for preparing and optimising the supply of a chromium catalyst to a polymerisation reactor wherein polyethylene, and preferably bimodal polyethylene, is prepared.

While the invention has been described in terms of presently preferred embodiment, reasonable variations and modifications are possible by those skilled in the art and such variations are within the scope of the described invention and the appended claims.

EXAMPLES

The present invention is illustrated by the following example of a production on a commercial-scale double loop reactor. For the comparative example a conventional catalyst feed system and control were used. The use of the current invention allows the polymerization reactor to be run at higher slurry densities with less variation than with conventional catalyst feeding control. The lower standard deviations indicate that the present invention allows for improved control of the polymerization process and thus higher product consistency.

TABLE 1

|  |  | Example | Comparative example |
|---|---|---|---|
| Reactor slurry density | kg/m$^3$ | 547 ± 3 | 531 ± 6 |
| Ethylene flow | kg/hr | 3461 ± 23 | 3855 ± 16 |
| Reactor ethylene concentration | wt % | 6.3 ± 0.1 | 6.6 ± 0.3 |
| Catalyst slurry flow | kg/hr | 70.6 ± 1.9 | 91.0 ± 2.8 |
| Catalyst slurry concentration | wt % | 0.35 ± 0.01 | 0.46 ± 0.05 |

The invention claimed is:

1. A system for supplying a polymerization catalyst to a polymerization reactor comprising:
   a) a storage vessel adapted to contain a concentrated catalyst slurry of solid catalyst particles in a diluent liquid;
   b) a mixing vessel connected to said storage vessel by at least one slurry conduit extending from said storage vessel to said mixing vessel;
   c) a transfer conduit extending from said mixing vessel to provide for the transfer of catalyst slurry from said mixing vessel to said polymerization reactor;
   d) a diluent supply line for supplying a diluent liquid to said concentrated catalyst slurry to provide for a diluted catalyst slurry in said mixing vessel;
   e) a cocatalyst storage vessel adapted to contain a cocatalyst;
   f) a cocatalyst supply line extending from said cocatalyst storage vessel to said transfer conduit to bring said cocatalyst into contact with said diluted catalyst slurry;
   g) an enlarged contact vessel interfaced in said transfer conduit between the connection of said cocatalyst supply line to said transfer conduit and said polymerization reactor.

2. The system of claim 1 further comprising a dump vessel for receiving waste from at least one of said mixing vessel, said storage vessel and said slurry conduit.

3. The system of claim 2 wherein said transfer conduit is provided with a pump at a location at an intermediate of said mixing vessel and said enlarged contact vessel.

4. The system of claim 3 wherein a section of the transfer conduit between said pump and said mixing vessel extends from said mixing vessel to the location of said pump upwardly from said mixing vessel by an angle of at least 10°.

5. The system of claim 4 wherein a section of said transfer conduit between said pump and said contact vessel extends downwardly from said pump by an angle of at least 10°.

6. The system of claim 5 wherein said section of said transfer conduit extending from said mixing vessel to said pump extends upwardly from said mixing vessel to said pump by an angle of at least 30°.

7. The system of claim 2 further comprising a waste conduit extending from said mixing vessel to said dump vessel.

8. The system of claim 7 further comprising a pump in said slurry conduit at a location intermediate of said storage vessel and said mixing vessel.

9. The system of claim 8 wherein a section of said slurry conduit between said pump and said storage vessel extends from said storage vessel to the location of said pump upwardly from said storage vessel by an angle of at least 10°.

10. The system of claim 9 wherein a section of said slurry conduit between said pump and said mixing vessel extends downwardly from said pump by an angle of at least 10.

11. A system for supplying a polymerization catalyst to a polymerization reactor comprising:
   a) at least two storage vessels adapted to contain a concentrated catalyst slurry; each of said storage vessels having an inlet line adapted to receive a concentrated slurry of catalyst particles;
   b) slurry conduits extending from each of said storage vessels to a mixing vessel and provided with metering valves to control the flow rate of catalyst slurry to said mixing vessel;
   c) a transfer conduit extending from said mixing vessel to said polymerization reactor;
   d) a diluent line connected to said transfer conduit for supplying diluent to said transfer conduit; and
   e) a dump vessel adapted to receive catalyst waste and an input line to said dump vessel extending from at least one of said mixing vessel and said slurry transfer conduits.

12. The system of claim 11 further comprising a cocatalyst storage vessel and a cocatalyst conduit extending from said cocatalyst storage vessel to said transfer line.

13. The system of claim 12 further comprising an enlarged contact vessel interfaced in said transfer conduit between said reactor and the connection of said cocatalyst supply conduit to said transfer line.

14. The system of claim 13 wherein said transfer conduit is provided with a pump at a location at an intermediate of said mixing vessel and said enlarged contact vessel.

15. The system of claim 14 wherein a section of the transfer conduit between said pump and said mixing vessel extends from said mixing vessel to the location of said pump upwardly from said mixing vessel by an angle of at least 10°.

16. The system of claim 15 wherein said section of said transfer conduit extending from said mixing vessel to said pump extends upwardly from said mixing vessel to said pump by an angle of at least 30°.

17. The system of claim 16 wherein a section of said transfer conduit between said pump and said contact vessel extending downwardly from said pump by an angle of at least 10°.

18. A method for supplying a catalyst to an ethylene loop polymerization reactor comprising:
   a) providing a concentrated slurry of olefin polymerization catalyst particles in a storage vessel;
   b) supplying said concentrated catalyst slurry from said storage vessel through a slurry conduit to a mixing vessel;
   c) adding a diluent liquid to said concentrated catalyst slurry in order to provide a diluted catalyst slurry in said mixing vessel;
   d) withdrawing said diluted catalyst slurry from said mixing vessel and supplying said diluted catalyst slurry through a transfer conduit to a slurry loop polymerization reactor in which ethylene is polymerized;
   e) mixing a cocatalyst with said diluted catalyst slurry prior to supplying said diluted catalyst slurry to said slurry loop polymerization reactor; and
   f) subsequent to the mixing of said cocatalyst with said diluted catalyst slurry passing said diluted catalyst slurry containing said cocatalyst through a section of said transfer conduit to provide for an increased contact time of said cocatalyst with said dilute catalyst slurry prior to the introduction of said catalyst slurry into said polymerization reactor.

19. The method of claim 18 wherein said cocatalyst is brought into contact with said dilute catalyst slurry while said catalyst slurry is transferred from said mixing vessel to said polymerization reactor through said transfer conduit extending from said mixing vessel to said polymerization reactor and wherein the contact time of said cocatalyst with said dilute catalyst slurry is increased by flowing said catalyst slurry through a chamber of increased volume in said transfer conduit at a location between the mixing of said cocatalyst with said slurry and the introduction of said slurry into said polymerization reactor.

20. The method of claim 18 wherein the concentrated slurry in said storage vessel has a concentration of a particulate catalyst solids within the range of 10-50 weight percent and the diluted catalyst slurry within said mixing vessel has a concentration of solid catalyst particles within the range of 0.1-10 weight percent.

21. The method of claim 20 wherein the concentration of particulate catalyst solids in said storage vessel is within the range of 20-40 weight percent and the concentration of particulate catalyst particles in said diluted catalyst slurry in said mixing vessel is within the range of 0.1-5 weight percent.

22. The method of claim 21 wherein the concentration of diluted catalyst solid catalyst particles in said diluted catalyst slurry is within the range of 0.5-4 weight percent.

* * * * *